April 21, 1931.  F. HIMMEL ET AL  1,801,273
CORNER CLAMP FOR STORE FRONT CONSTRUCTION
Filed March 22, 1930
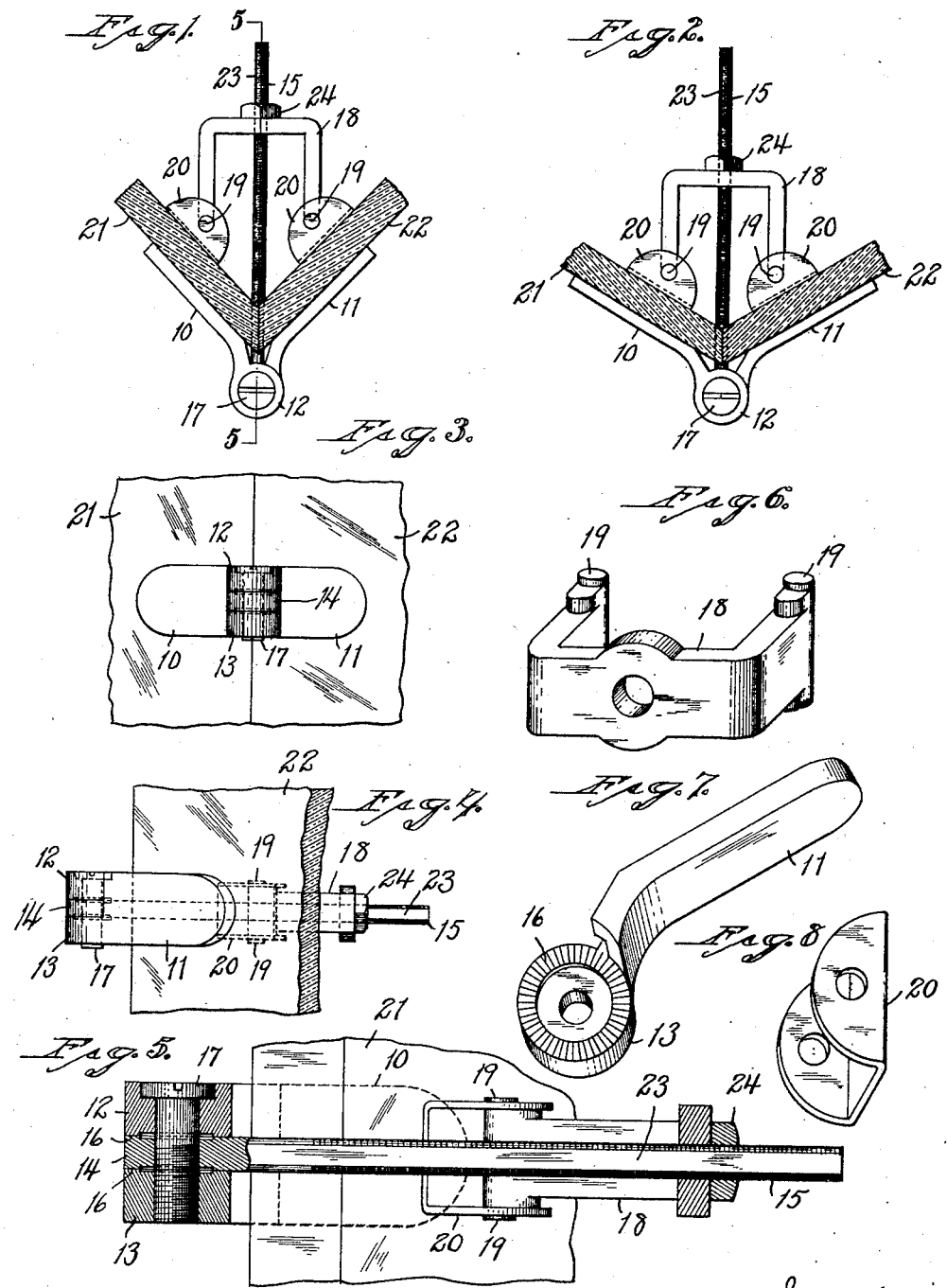

Patented Apr. 21, 1931

1,801,273

UNITED STATES PATENT OFFICE

FRED HIMMEL AND ISIDORE HIMMEL, OF NEW HAVEN, CONNECTICUT, ASSIGNORS TO THE HIMMEL BROTHERS COMPANY, OF NEW HAVEN, CONNECTICUT, A CORPORATION

CORNER CLAMP FOR STORE-FRONT CONSTRUCTION

Application filed March 22, 1930. Serial No. 438,064.

This invention relates to improvement in corner-clamps for store-front construction, which consist of a pair of hinged clamping-plates to be applied to the outside of glass store-fronts, with means connected therewith for clamping the sheets of glass in position.

The object of this invention is to provide simple means adapted for use with sheets of glass arranged for varying angles, and the invention consists in the construction as hereinafter described and particularly recited in the claims.

In the accompanying drawings:

Fig. 1 is a plan view of a corner-clamp for store-front construction constructed in accordance with our invention;

Fig. 2 is a similar view showing the plates adjusted to a different angle;

Fig. 3 is a front view of the same;

Fig. 4 is a side view of the same;

Fig. 5 is a sectional view on the line 5—5 of Fig. 1;

Fig. 6 is a perspective view of the yoke detached;

Fig. 7 is a perspective view of one of the clamping-plates detached; and

Fig. 8 is a perspective view of one of the clamping-shoes detached.

In carrying out our invention, we employ two corner-face-plates 10 and 11 each formed at one side of its inner end with a knuckle, numbered 12 and 13, the thickness of the knuckles being such as to provide space between them for the reception of a transversely-flattened head 14 of a screw 15, and preferably the adjacent faces of the knuckles and screw-head will have radial ribs 16 whereby the parts may be positively locked together by a screw 17. Set over the end of the screw 15 is a yoke 18 formed at the end of its legs with trunnions 19 upon which are pivotally-mounted clamping-shoes 20 adapted to engage with the inside of sheets of glass 21 and 22. Preferably, the screw 15 will be provided with flat faces 23 on opposite sides near the head. This is to avoid unnecessary cutting away of the edges of the glass at the points where the clamps are applied.

In applying the clamps the plates 10 and 11 will be adjusted to correspond to the angles of the sheets of glass and when adjusted, are fixed by the screw 17 so as to form a rigid member. The yoke is then slipped over the end of the screw until the shoes 20 engage with the inner face of the glass and these shoes, being pivoted, will take a position with their faces flatly against the inner face of the glass and the yoke is forced toward the glass by means of a nut 24 on the screw 15.

We thus produce, in a very simple manner corner clamps for store-front construction which are readily adapted to be adjusted to various angles and a clamping-yoke with pivotal shoes which will adjust themselves to the angles of the sheets of glass to be clamped.

We claim:

A corner-clamp for store-front construction consisting of two clamping-plates formed with complementary knuckles, a screw having a transversely-flattened head adapted to be entered between said knuckles, the adjacent faces of the knuckles and both faces of the screw-head formed with radial interlocking-notches, means for connecting the said knuckles and screw together, a yoke adjustably mounted on said screw, and shoes pivotally mounted on the legs of said yoke.

FRED HIMMEL.
ISIDORE HIMMEL.